March 16, 1943.   C. J. CRANE   2,313,733
LEVELLING DEVICE
Filed Aug. 26, 1940   2 Sheets-Sheet 1

INVENTOR.
Carl J. Crane
BY
ATTORNEY

March 16, 1943.  C. J. CRANE  2,313,733
LEVELLING DEVICE
Filed Aug. 26, 1940  2 Sheets-Sheet 2

INVENTOR.
Carl J. Crane
BY
ATTORNEY

Patented Mar. 16, 1943

2,313,733

UNITED STATES PATENT OFFICE 2,313,733

LEVELING DEVICE

Carl J. Crane, Dayton, Ohio

Application August 26, 1940, Serial No. 354,259

9 Claims. (Cl. 33—206)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to instruments particularly well adapted for use upon aircraft for directional or other indicating purposes.

Heretofore devices have been provided for imparting information to aircraft pilots, navigators, etc., such as designating the position of the aircraft with respect to the earth. Such devices have utilized various forms of pendulums, liquid levels, and other leveling devices. Gyroscopic types of indicating instruments have been provided, which utilize the pendulum effect in order to insure that the axis of the gyroscope is capable of attaining a predetermined position with respect to the earth's surface. A gyroscope of the type used in flight indicators has some of the properties of a pendulum of a very long period of oscillation. This is usually accomplished by making the gyroscope pendulous, or by attaching controlling devices of a pendulous nature, the purpose of which is to cause the gyroscope to be affected by the attached pendulum so that it will be returned to a pre-selected position in event it should depart from that position during flight maneuvers. It is the primary purpose of the present invention to provide a mass, which in itself is non-pendulous, and precisely balanced about a given axis upon a support, the latter of which may be moved without imparting any substantial movement to the balanced mass. This will give information of a change in angular relationship between the mass and its support.

It is furthermore a purpose of this invention to provide in a level indicator a non-pendulous static mass having a high moment of inertia and mounted upon a balanced axis in a suitable support. With it is cooperatively associated a pendulous controlled device, having a relatively low moment of inertia for returning the static mass to a normal relation with respect to its support.

It is an object of this invention to provide an aircraft instrument of relatively simple arrangement with a high degree of efficiency, the purpose of which is to indicate the banking angle, climbing angle, or gliding angle of an airplane in flight in much the same manner as the usual flight indicators of gyroscopic design do at the present time.

A further object of this invention is provision of a directional indicating instrument for aircraft including a precisely balanced mass movably supported on a definite axis, and which mass due to its inertia will retain a relatively fixed relation with respect to the earth, as the support upon which it is mounted is moved with the aircraft; the device including an erecting arrangement for the mass capable of erecting the mass at a definite rate; the device including means for placing the erection system into or out of operation automatically under conditions that best meet the requirements for which the instrument is to be used.

A further object of this invention is to provide a non-frictional device for indicating the relative position of a movably supported mass within a case, at a remote indicator, preferably by photo-electric means.

Other objects and advantages of this invention will be apparent during the course of the following detailed description.

In the accompanying drawings, forming a part of this specification, and wherein similar reference characters designate corresponding parts throughout the several views.

Figure 1:
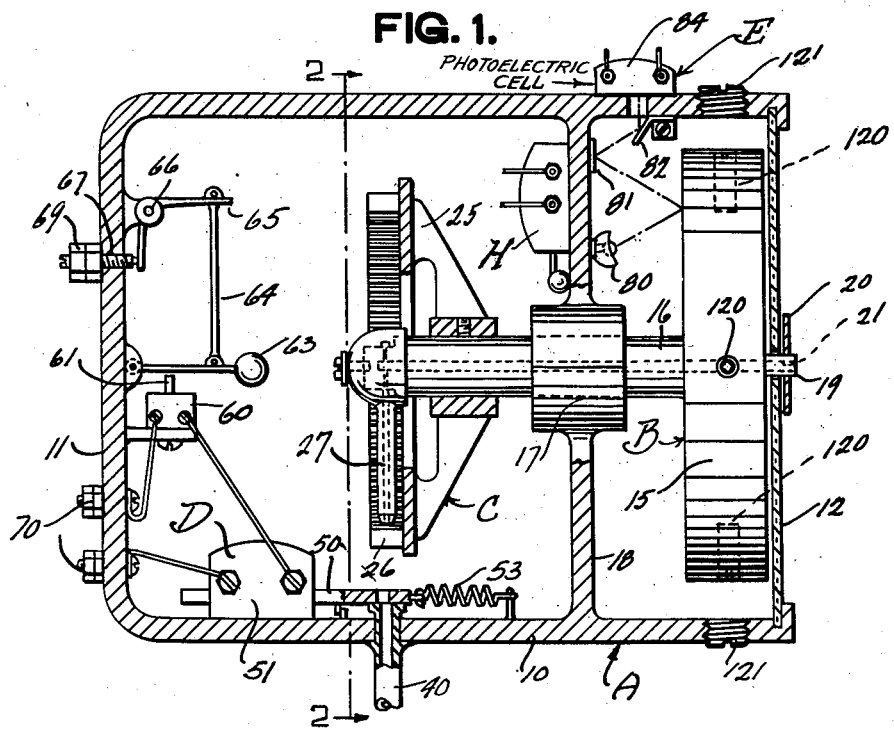
Figure 1 is a vertical sectional view taken through the improved instrument longitudinally of the axis upon which the movable mass in the case is mounted.

In the drawings, wherein for the purpose of illustration there is shown only a preferred embodiment of the invention, the letter A may generally designate a case or support which is attached to an instrument panel or in some other convenient and desirable location in the aircraft. In it is associated the balanced non-pendulous static mass B having a relatively high moment of inertia and journaled in the casing A so that the mass will not move when the casing is moved normal to the axis of mounting of the mass. Erector means C is provided for the purpose of imparting movement to the non-pendulous mass B responsive to attitude changes of the aircraft to which the leveling device is attached. The gravity controlled means D is provided for rendering operative or inoperative the erector means C. Means E in the nature of a photo-electric cell, actuated from a variable light source controlled by the relative positioning of the supporting casing A with respect to static mass B, is provided for operating remote instruments F and G for indicating directional and other characteristics of the aircraft during flight.

The support or casing A may be of any approved construction. It preferably includes a cylindrical shaped hollow body 10 having an end wall 11 and provided with a closure 12 of Lucite, the arrangement of which will be subsequently described. The casing is provided with attaching flanges 13 of any approved construction, and the casing may assume a position with its longitudinal axis in the line of the axis of the aircraft or normal thereto, since the instrument is intended to be used for indicating bank, turn or glide.

Referring to the non-pendulous static mass B, the same includes a wheel 15 having an integral supporting shaft 16 extending through a journal 17 provided on a wall 18 of the casing A. The journal 17 is provided with an anti-friction bearing, or some other type of bearing, which is substantially frictionless, and has the ability to withstand both normal and radial loadings to the end that lost motion will be substantially eliminated in positioning the mass or wheel 15. Forming a part of the shaft is a reduced forward extension 19 which projects through an opening in the front closure 12 of the casing A; the forward end of the shaft outside of the closure 12 being provided with a disc 20 of any approved character, attached therewith, which, together with the case closure 12 provides a labyrinth packing gland to prevent the leakage of air into the casing A. The casing A is intended to internally maintain a pressure substantially below that of surrounding atmospheric pressure. The shaft 16 is drilled or otherwise provided with an air duct 21 extending entirely therethrough to permit ingress of air from the atmosphere in order that air or other fluid may be withdrawn through the pendulum arrangement of the erector means C to be subsequently described.

Referring to the erector means C the shaft 16 at its end within the chamber of the casing A is provided with an erector wheel 25 which is preferably fastened to the shaft 16 with a press fit. The wheel 25 is provided with rearwardly extending vanes or fins 26 constituting turbine means arranged annularly around the axis of the shaft, for the purpose of receiving a jet of air or other fluid from the pendulus jet means 27, which is pivotally mounted upon the shaft 16.

Figure 3:
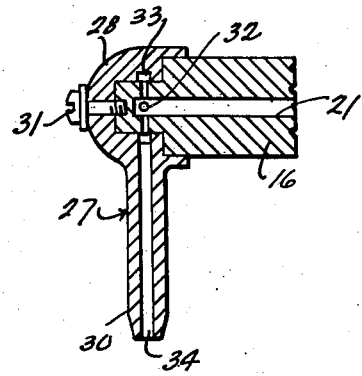
Figure 3 is a fragmentary vertical sectional view taken through a pendulum, showing the cooperating fluid jet arrangement of the erecting system.

The erector pendulum or pendulous element 27 is provided with a hollow attaching head 28 which fits over the rear end of the shaft 16, and it furthermore has a depending pendulum shank 30. An attaching screw 31 attaches the head 28 of the pendulum 27 upon the shaft 16, as shown in Figure 3 of the drawings; the clearance of the head in its mounting upon the shaft 16 being such that the pendulum 27 may freely swing or move relative to the shaft 16, but the clearance being such that air leakage will be kept to a minimum. The bearing of this pendulum upon the shaft may be modified to include bearings such as ball or other anti-friction types. The effect of these bearings surfaces provides a labyrinth packing effect which insures reasonable free passage of air from the duct 21 of the shaft through the lateral ports 32 provided therein, and thence to the annular passageway 33 in the head of the pendulum and into the air passageway 34 through the pendulum shank 30.

Air is withdrawn from the chamber of the casing A by means of a tube 40.

Figure 2:
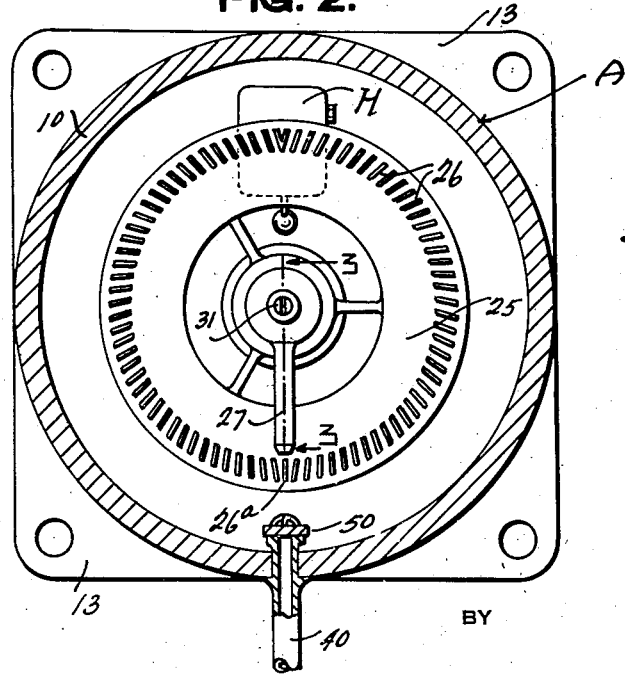
Figure 2 is a cross sectional view taken substantially on the line 2—2 of Figure 1.

The arrangement of the vanes 26 on the erector wheel C is such that the vane 26a, and adjacent vanes also may be preferably parallel to the airflow from the jet of the erector pendulum, as shown in Figure 2. The other vanes present a slanting surface to the airflow from the pendulum so as to impart a rotation to the wheel 25 and through the shaft 16 to the mass or wheel 15 also, so that the mass will follow the movement of the erector pendulum; the rate of erection of the mass of course being dependent upon the force of the air flowing through the pendulum; the angle of the vanes, and the inertia of the static mass and other parts.

Figure 8:
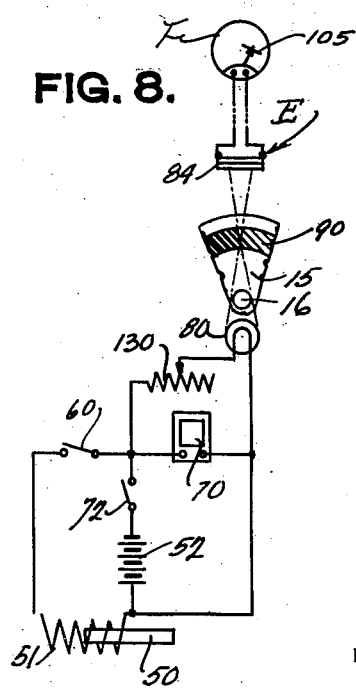
Figure 8 is a diagrammatic representation of the electrical system for operating such features of the improved instrument as a static friction eliminator or vibrator, erection control device, and photronic control means.

The gravity controlled means D for rendering the erector means C operative or inoperative includes a spring loaded slide valve 50, actuated by a solenoid 51, shown in Figures 1 and 8 of the drawings; the solenoid receiving its energy from a suitable source, such as a battery 52, shown in Figure 8. When the solenoid 51 is not energized, the spring 53 causes the slide valve 50 to remain in the open position shown in Figure 1. Thus the air is permitted to flow from the case. Direction of air or other operating fluid through the casing may be taken care of by pump suction from the line 40 or it may be forced into the end of the shaft at 19. A switch 60 of a sensitive nature, similar in all respect to that type known as the micro switch is mounted in the casing on the rear wall 11, as shown in Figure 1. It has an actuating plunger 61 positioned so as to receive an impulse from a resiliently supported weighted arm 63. The arm 63 is supported by means of a link 64 which is attached to a cantilever leaf spring arm 65. The latter forms part of a bell crank which is pivoted at 66 on the inside of the casing and is adjustable by means of a screw 67, as shown in Figure 1, so that should the apparent weight of the mass 63 increase the actual movement transmitted to the micro switch plunger will serve to operate the switch efficiently. The screw 67 may be provided with suitable lock nuts 69, as shown in Figure 1. Suitable binding posts 70 may be provided to lead electrical energy into the case of the instrument to the solenoid and switch above described.

The improved instrument is preferably provided with an electrical buzzer H, shown in Figure 1 of the drawings, for the purpose of imparting a high rate vibration of suitable amplitude and frequency to insure the maximum reduction of static friction within journal 17. This vibrator or buzzer H is connected in the wiring circuit shown in Figure 8 of the drawings. The wire circuit may of course include a switch 72 for rendering the entire circuit inoperative.

Referring to the means E, the same includes a lamp 80 preferably constructed in the form of a high grade exciter lamp of well aged filament so as to provide the rear surface of the mass or wheel 15 with suitable illumination which is reflected, under conditions to be later described, from the mass or wheel 15, to mirrors 81 and 82. From the latter mirror the light rays are reflected to the sensitive surface of a photronic cell 84. Energization of the photo cell 84 serves to operate certain remote indicating instruments F and G to be subsequently described.

Figure 5:
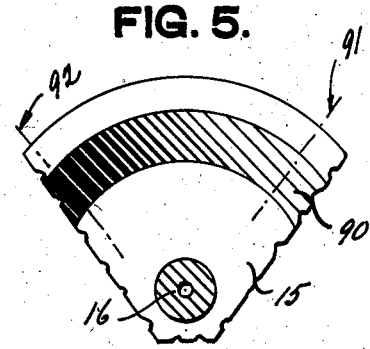
Figure 5 is a fragmentary sectional view showing diagrammatically the reflecting surface of the supported mass of the instrument, which is cooperatively used for operating a photo-electrically controlled remote indicating device.

By reference to Figure 5 it will be seen that an area 90 on the rear surface, annularly arranged about the axis of the shaft 16, is provided with graduated light reflective coloration in such manner that the light reflected nearest the line 91 is of a different value than the light reflected along the line 92; the graduation of reflectivity from the line 91 to line 92 being of a pre-selected value in order that relative movement between the wheel 15 and the supporting casing A will impart a substantially proportionate movement to the indicating elements of the instruments F and G.

The interior of the casing A is preferably painted or otherwise treated with a dull black finish, as are also all of the other elements within the forward compartment of the casing including the surface of the wheel 15, excepting of course the area 90 so no light will be reflected except from the surface of the wheel included in this area 90. The area 90 is of course not restricted to that actually shown in the drawings but may form a band continuously adjacent to the periphery of the wheel and extend 360 degrees around the wheel 15.

In the preferred instrument construction the bearings and all other structure are preferably formed of the same material, or at least the materials of which the various parts are formed must have the same or very similar co-efficients of expansion. For instance, K-Monel metal or similar non-corrosive and non-magnetic metal may be used.

Figure 4:
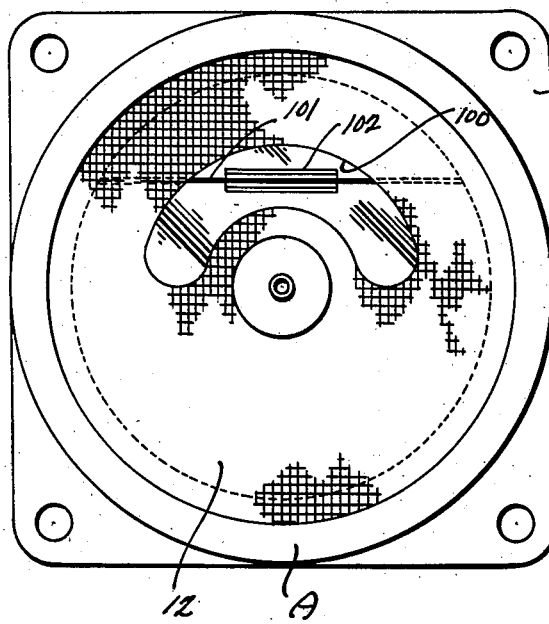
Figure 4 is a front view of the improved instrument, showing the indicia which will designate to the pilot the angular relation of the static mass and the case in which it is movably supported.

The closure plate 12 of the casing A is preferably opaque except for an arcuate portion indicated at 100 in Figure 4 of the drawings. This portion is transparent and is preferably provided with a suitable block arrangement of lines 102 delineated or engraved thereon. The wheel or mass 15 on its forward surface is preferably provided with a delineated or engraved line 101 in visual relation with respect to the lines markings 102 so as to impart information as to the angle existing between the wheel or mass 15 and the case A of the instrument.

Figure 6:
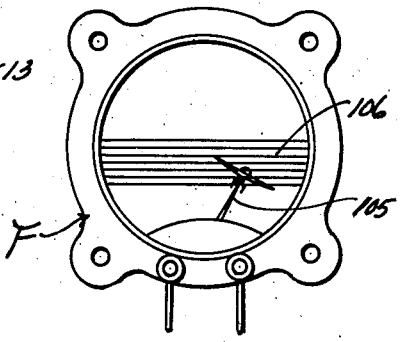
Figure 6 is a front elevation of a remote indicator that may be used to indicate the lateral angle of an aircraft upon which the instrument is capable of use.

The instrument F shown in Figure 6 includes a pointer 105, the end of which is in the form of the wings of an airplane. This instrument is of the micro galvanometer type, and the lens is provided with suitable horizontal lines 106 delineated or otherwise positioned thereon serving to indicate with reference to the pointer 105 the bank angle of an aircraft in which the instrument is installed.

Figure 7:
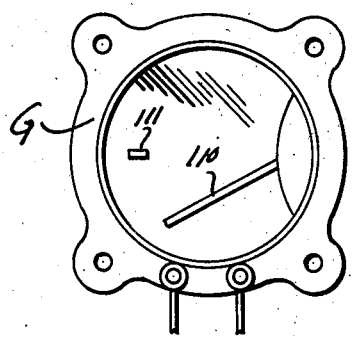
Figure 7 is a front view of a remote indicator used to indicate climb or glide angles of an aircraft upon which the instrument can be used.

The instrument G is provided with a pointer or indicating element 110 normally horizontally positioned having an index element 111 on the closure of the instrument G for the purpose of indicating climb and glide. When the nose of the aircraft is on the horizon the pointer 110 will match the index 111. If the nose of the aircraft is above the horizon the indicator 110 will appear above the index 111, and during a glide the indicator 110 is below the index, as shown in Figure 7.

In order to accurately balance the wheel 15 balancing plugs 120 are provided at 90 degree intervals surrounding the wheel, in the form of screws. A plug opening 121 may be provided in the case A, as shown in Figure 1 for insertion of a wrench in order to adjust the position of the plugs or screws 120.

Referring to the operation of the device, it will be assumed that the instrument is mounted on the instrument panel of the airplane in such manner that the view presented to the pilot would be that shown in Figure 4 of the drawings. Under such circumstances the instrument shown in Figure 6 is attached to the photoelectric cell circuit, and the instrument will then be used for indicating bank, turns, etc. In event the instrument is to be used for indicating the pitch angle of the aircraft the longitudinal axis of the instrument is positioned normal to the axis of the aircraft upon which the instrument is positioned, and the instrument shown in Figure 7 is connected in the photo-electric cell circuit.

It is well known that a mass supported in frictionless bearings and entirely balanced in such bearings will maintain a given relationship with the earth. This relationship will be such as the earth rotates that the mass will preserve its position in space and therefore there will be from time to time a noticeable change in the angular relationship of the supported mass and some reference line drawn to the earth. In the present description it is assumed that the mass or wheel 15 to all practical purposes, is in very careful balance, that the bearing 17 is of a very high quality radial and thrust bearing, and therefore substantially frictionless, and that the effects of air viscosity on the wheel or mass 15 from the interior of the case is of a low order and entirely uniform. Under these conditions a movement imparted to the case A of the instrument should impart little or no movement to the mass or wheel 15. Again, under practical considerations any movement that is imparted to the mass or wheel 15 is likely to be averaged out since an airplane flying under the conditions normally to be expected will impart movement both clockwise and counterclockwise to the case A of the instrument and thereby average out any imparted movement to the mass or wheel 15.

It is, however, well understood that rotation of the earth, vibration, and friction, both mechanical and air friction, will cause after a period of time some displacement of the wheel 15. It is therefore the purpose of the erector pendulum 27 to supply a suitable torque to the shaft 16 in such a manner that the wheel 15 will be returned to a position that will secure a substantial parallelness of the horizon line 107 and the earth's horizon. Assume that under one or more of the influences noted above the wheel 15 rotates through a small angle (either clockwise or counterclockwise) and comes to rest while the airplane is flying essentially a straight course in level flight. Under this condition the pendulum 27 will maintain a line essentially perpendicular to the earth's surface and air flowing from the jet of the pendulum will impinge on the vanes 26 of the wheel 25 in such a manner that the wheel 25 will be restored to that position shown in Figure 2, thereby returning the wheel 15 to its correct position with respect to the earth's surface. It should be noted from Figure 2 that these vanes immediately below the jet of the erector pendulum 27 are parallel to the airflow from the jet of the erector pendulum. When, however, the wheel 25 departs from the position shown in Figure 2 it is seen that the vanes 26 present a slant surface to the airflow from the pendulum 27 in a manner which imparts a rotation to the wheel 25 and thereby to the wheel 15 which in all cases provides for a movement of the wheel 25 and the wheel 15 which substantially follows the movement of the erector pendulum 27. It is seen that the erection rate may be controlled by controlling the air suction to the case of the instrument or by controlling the angularity of the vanes 26 with respect to the flow of air from the pendulum 27. Under most conditions the rate of erection will be of a low order in order that the mass or wheel 15 does not too rapidly follow the apparent vertical as should be the case when the airplane is flown in a banked turn for a reasonably long period of time.

Under some conditions, however, it may be desirable to fly the airplane in a banked turn for a reasonably long period of time, and it is therefore under this condition that means are provided in the instrument for reducing or eliminating the effect of the erector pendulum and its airflow on the vanes 26 of the erector wheel 25. For this purpose the automatic erector cutoff described above has been supplied to the instrument. Assuming that the airplane is flown in a banked turn of such a nature that the apparent force of gravity causes a depression of the weight 63 to actuate the plunger 61 of the micro switch 60. The operation of the micro switch serves to close the circuit to the solenoid 51 which in turn attracts the plunger 50, thereby cutting off the air suction to the case and eliminating airflow from the erector pendulum 27. Under this condition the wheel or mass 15 will not be rotated in a manner to indicate the apparent vertical but will be left in some other position substantially approximating the true vertical. It can be seen therefore that any selected value of gravity can bring about the cutoff of the erection system in the instrument.

There can always be chosen some value of G (gravity) in which the erection system will serve to return the mass or wheel 15 to a position representative of the apparent vertical.

After the angle between the case of the instrument of the wheel 15 changes from that shown in Figure 4 there will be some portion of the area between the line 91 and the line 92 that will reflect light coming from the lamp 80 to the mirrors 81 and 82 and thence to the photronic cell 84. By control of the rheostat 130 (Figure 8) a suitable adjustment can be made to either of the indicators, shown in Figures 6 and 7. These indicators are microammeters sensitive to the energy coming from the photronic cell 84. It can be seen therefore that the position of either of the pointers 105 or 110 can be selected by controlling the intensity of reflected light to the photronic cell 84. As the case of the instrument is rotated with respect to the wheel or mass 15 the light intensity being imparted to the photronic cell 84 is varied, depending upon the reflective quality of that portion of the area 90 momentarily reflecting light from the lamp 84.

In the event the instrument is used to indicate the pitch angle of the airplane the indicator shown in Figure 7 might be exemplary of a type used to indicate the pitch angle of the airplane in flight, and the position shown in the drawings in Figure 7 could be chosen as a position in which the pointer 110 indicates that the nose of the airplane is below the horizon a given amount. When the nose of the airplane is on the horizon the pointer 110 would match the index 111, and if the nose of the airplane was above the horizon the indicator 110 would appear, in Figure 7, above the index 111. In the manner described above this would be expressive of a different value of light reflected from the surface of the wheel 15 to the photronic cell 84 which in turn would be expressive of an angular relationship other than the normal. Under the condition where the mass or wheel 15, as shown in Figure 1, is parallel to the line of flight of the airplane it can be seen that the apparent vertical at which the wheel 15 will become responsive will indicate the pitch angle of the airplane. There will of course be momentary and minor departures in correct indication when the mass or wheel 15 tries to follow the erroneous position taken by the erector pendulum 27 but these erroneous positions (apparent vertical) under all practical conditions are of short duration and therefore will cause no serious improper indication of pitch angle.

In the event the instrument is used to indicate the bank angle of the airplane the indicator shown in Figure 6 might be exemplary of a type used to indicate this angle. This bank angle may be the result of the lowering either the right or left wing of the airplane without or indeed with attendant and simultaneous turn of the airplane. In either case there is a resulting angle established between the case A of the instrument and the mass or wheel 15 as has been already described above for pitch angle changes. Any angularity established between the wheel 15 and the case A of the instrument establishes therewith a different related position between the lamp 80 and the wheel 15 with its associated reflective area 90. As described above for pitch angle changes, the difference in reflectivity of the area included within the points 91—92 of Figure 5 will be productive of a greater or lesser activation of the photocell 84 with consequent change in setting of the microammeter pointer 105 of Figure 6 which is therefore productive of an indication of bank angle.

It can readily be seen from what has been described above as to the operation of the leveling device, that a combination indicator may be utilized instead of those separate indicators shown in Figures 6 and 7 by which a combined indication of bank and climb can be indicated. In fact, reference is made to my copending application Serial No. 335,955, filed May 18, 1940, pertaining to flight indicators in which is shown a combined pitch and bank indicator photoelectrically driven which might be substituted for the pitch and climb indicator of the present invention as shown in Figures 6 and 7.

In the event at any time it is desirable to reset the wheel 15 to correspond with a given position as indicated by other instruments, it is simply necessary to grasp the shaft extension elements 19—20 and rotate it and its associated wheel 15 to the position selected. In a sense therefore the elements 19—20 provide a caging mechanism as is well known to the art of gyroscopic caging devices.

While it has been shown in the drawings and descriptions above the general form of the leveling device, it is to be understood that this represents one form of such a device based upon well-known physical phenomena and therefore for the limitations imposed upon this invention reference is made to the appended claims.

I claim:

1. In a device for designating the attitude of a vehicle to which it is attached, the combination of a support, a non-pendulous mass mounted on the support to rotate about an axis that is predeterminately located with respect to said vehicle, a light reflector carried by said mass, said light reflector being graduated and varying in reflectivity around the axis of movement of the non-pendulous mass, a photo-electric cell, a source of light, means for directing light from the said light source onto the graduated reflecting area of said mass for reflection onto the photoelectric cell, means for varying the intensity of the light source, pendulous erector means mounted upon the support having a fluid jet associated therewith on the arm of the pendulum remote from its pivot, vane means carried by said mass onto which the flow of the jet is directed for erecting the position of the non-pendulous mass to a pre-selected position, and meter means responsive to energization of the photoelectric cell for indicating the attitude of the vehicle to which the device is attached.

2. In a leveling device, a support, a balanced mass mounted upon said support for pivotal movement with respect thereto about a normally horizontal axis, reference indicia arranged in co-operative relationship on said mass and support to indicate the relative position of said mass and support about said axis, pendulous air jet means pivoted about an axis parallel to said first-named axis and vane means concentric with said jet means and connected with the mass, the air from the jet means impinging on the vane means and urging the mass to a preselected position with respect to the air jet means when the mass and air jet means move relatively about their axes in response to attitude changes of a vehicle or the like to which the leveling device is attached.

3. In a level-indicating instrument for a vehicle, a precisely balanced mass mounted upon said vehicle for pivotal movement with respect thereto about a normally horizontal axis, said mass being predeterminately positioned with respect to said vehicle when the latter is in a given attitude, said mass having a sufficiently large amount of inertia to remain substantially static upon relative movement between said vehicle and mass about said axis, means for indicating the relative positions of said vehicle and mass, turbine means connected with said mass, and gravity-responsive pendulous fluid jet means for operating said turbine means to return said mass to said predetermined position when displaced therefrom.

4. In an instrument for determining change of attitude of a vehicle to which it is attached, a precisely balanced mass predeterminately positioned with respect to said vehicle when the latter is in a given attitude, means for mounting said mass for pivotal movement about an axis having a predetermined relationship with respect to said vehicle, said mass having a moment of inertia sufficiently large to remain substantially static upon relative movement between said vehicle and mass about said axis, means for indicating the relative position of said vehicle with respect to said mass, turbine means connected with said mass, and gravity-responsive pendulous fluid jet means for operating said turbine means to return said mass to said predetermined position when displaced therefrom.

5. A device recited in claim 3 and further including means responsive to a predetermined acceleration of said vehicle when in an attitude other than said given attitude for rendering said gravity-responsive means inoperative.

6. In a level-indicating instrument for a vehicle, a precisely balanced mass mounted upon said vehicle for pivotal movement with respect thereto about a normally horizontal axis, said mass having sufficient inertia to remain substantially static upon movement of said vehicle about said axis, means for indicating the relative position of said mass with respect to said support, vane means carried by said mass, and gravity-responsive pendulous fluid jet means mounted upon said vehicle to pivot about a normally horizontal axis and operatively arranged in predetermined relationship with respect to said vane means, the fluid from said jet means operating upon said vanes to urge said mass to said predetermined relationship with respect to said jet means when said mass and jet means move relatively about their axes.

7. In a level indicating instrument for a vehicle, a casing, a precisely balanced mass mounted in said casing for relative pivotal movement with respect thereto about a normally horizontal axis, said mass having sufficient inertia to remain substantially static upon movement of said vehicle about said axis, means for indicating the relative position of said casing with respect to said mass, vane means carried by said mass, pendulous fluid jet means pivotally mounted on said casing in operative relationship with respect to said vane means, the fluid from said jet means urging said vane means and mass to a preselected position with respect to said jet means when said mass and jet means move relatively, said casing having fluid-entrance means operatively connected to said jet means, and fluid-exit means, and means responsive to a predetermined acceleration of said vehicle in an attitude other than level for closing said fluid-exit means to render said fluid-jet means inoperative.

8. In an instrument for determining change of attitude of a vehicle to which it is attached, a precisely balanced mass, means for mounting said mass for pivotal movement about an axis having a predetermined relationship with respect to said vehicle, a diameter of said mass being predeterminately positioned with respect to said vehicle when the latter is in a given attitude and having a relatively large moment of inertia so as to remain substantially static upon relative movement between said vehicle and mass about said axis, and means for indicating the relative position of said vehicle with respect to said mass including an area on said mass of variable light reflectivity, a source of light directed upon said reflecting area, photoelectric means onto which the rays are reflected from said area and position indicating means operated by said photoelectric means.

9. In an instrument for determining change of attitude of a vehicle to which it is attached, a precisely balanced mass, means for mounting said mass for pivotal movement about an axis having a predetermined relationship with respect to said vehicle when the latter is in a given attitude and having a moment of inertia sufficiently large to remain substantially static upon relative movement between said vehicle and mass about said axis, means for indicating the relative position of said vehicle with respect to said mass and means for returning said mass to said predetermined position upon departure therefrom including a pivotally mounted pendulous fluid jet, vanes carried by said mass and positioned to be impinged by said jet, the vanes which are adjacent the fluid jet when said mass is in said predetermined position being parallel to the direction of flow from said jet and the vanes on the opposite sides of said adjacent vanes being oppositely inclined to present a slanting surface to the fluid flow from said jet.

CARL J. CRANE.